United States Patent
Davidson et al.

(10) Patent No.: US 7,852,849 B2
(45) Date of Patent: Dec. 14, 2010

(54) PROVIDING DYNAMIC QUALITY OF SERVICE FOR VIRTUAL PRIVATE NETWORKS

(75) Inventors: Andrew Jamie Davidson, Killarney Heights (AU); David John Brooks, Gladesville (AU); Michael James Berry, East St. Kilda (AU)

(73) Assignee: Bridgewater Systems Corp., Ottawa, Ontario (CA)

(*) Notice: Subject to any disclaimer, the term of this patent is extended or adjusted under 35 U.S.C. 154(b) by 245 days.

(21) Appl. No.: 12/042,078

(22) Filed: Mar. 4, 2008

(65) Prior Publication Data
US 2009/0225762 A1    Sep. 10, 2009

(51) Int. Cl.
*H04L 12/28* (2006.01)
*G06F 15/173* (2006.01)

(52) U.S. Cl. .................. 370/395.21; 370/264; 370/401; 370/412; 370/252; 709/220; 709/221; 709/222; 709/225; 709/226

(58) Field of Classification Search ......... 370/252–465; 709/223–244
See application file for complete search history.

(56) References Cited

U.S. PATENT DOCUMENTS

| | | | |
|---|---|---|---|
| 6,452,915 B1 * | 9/2002 | Jorgensen | 370/338 |
| 6,590,885 B1 * | 7/2003 | Jorgensen | 370/338 |
| 6,640,248 B1 * | 10/2003 | Jorgensen | 709/226 |
| 6,674,756 B1 * | 1/2004 | Rao et al. | 370/395.21 |
| 6,865,185 B1 * | 3/2005 | Patel et al. | 370/412 |
| 7,209,479 B2 * | 4/2007 | Larson | 370/389 |
| 7,305,492 B2 * | 12/2007 | Bryers et al. | 709/249 |
| 7,421,487 B1 * | 9/2008 | Peterson et al. | 709/223 |
| 7,526,541 B2 * | 4/2009 | Roese et al. | 709/223 |
| 7,577,161 B2 * | 8/2009 | Li et al. | 370/468 |
| 7,609,647 B2 * | 10/2009 | Turk et al. | 370/252 |
| 7,649,848 B1 * | 1/2010 | Swan et al. | 370/252 |
| 7,698,457 B2 * | 4/2010 | Ghetie et al. | 709/238 |
| 2002/0093915 A1 * | 7/2002 | Larson | 370/235 |
| 2003/0140131 A1 * | 7/2003 | Chandrashekhar et al. | 709/223 |
| 2005/0088977 A1 * | 4/2005 | Roch et al. | 370/254 |

FOREIGN PATENT DOCUMENTS

WO    WO 00/78004 A2    12/2000
WO    WO 0078004 A2 *   12/2000

OTHER PUBLICATIONS

The International Search Report and the Written Opinion for PCT/IB2008/001358, prepared on Dec. 1, 2008 and mailed on Dec. 5, 2008, 16 pages.

* cited by examiner

*Primary Examiner*—Ayaz R. Sheikh
*Assistant Examiner*—Venkatesh Haliyur
(74) *Attorney, Agent, or Firm*—Sterne Kessler Goldstein & Fox, P.L.L.C.

(57) ABSTRACT

Methods, systems, and computer program products for providing dynamic Quality of Service (QoS) for connections to virtual private networks (VPNs) are provided. The method receives a message from an organization associated with the VPN, wherein the message includes information identifying the VPN connection and information associated with the organization. The method then determines, based on a set of rules defined for the organization, a QoS level to apply to the connection, and applies the determined QoS level to the connection. The QoS applied to the connection corresponds to the organization hosting the VPN and not the QoS associated with a personal or home account QoS that would otherwise be applied to the connection.

30 Claims, 6 Drawing Sheets

PROVIDING DYNAMIC QUALITY OF SERVICE FOR VIRTUAL PRIVATE NETWORKS

FIELD OF THE INVENTION

This application relates generally to data communications and specifically to the provision of dynamic quality of service to users of virtual private networks.

BACKGROUND OF THE INVENTION

Corporations and organizations increasingly rely upon remote and off-site employees and users to accomplish tasks while they are traveling or at home. Offsite employees may 'telecommute' while traveling, from their homes, and/or from remote office locations. These remote users and off-site employees often need to access their corporate or organization networks from client devices that are not directly connected to their corporate or organization network.

Remote users typically access corporate and organization networks by connecting to a Virtual Private Network (VPN) in order to access the same applications, servers, databases, and directories/files that they are able to access while directly connected to a corporate or organization network. Although VPN connections allow remote users and offsite employees to execute applications and access files hosted by a corporate or organization network, the relatively low quality (i.e., lower bandwidth, higher latency, and increased delay) of some user's remote connections often translates into an inferior experience as compared to direct network connections. Lower quality VPN connections hinder the productivity of off-site employees and force their employers to choose between subsidizing upgrades to their employee's remote connections and mandating that telecommuting employees pay for upgraded remote connectivity themselves.

In the fields of packet-switched networks, telecommunications, and computer networking, Quality of Service (QoS) refers to a set of technology and techniques designed to provide improved service to selected network traffic or users. The goal of QoS is to provide guarantees on the performance of a network or service. QoS metrics can include availability, bandwidth, latency, delay, upload data transfer rate, download data transfer rate, and per-session upload/download limits (i.e., total amount of megabytes or gigabytes that can be uploaded and/or downloaded during a network session).

A network can assign different QoS levels to different network client devices and users. QoS can also guarantee a certain level of performance to a user or client device associated with a user in accordance with requests from an application program or an internet service provider's (ISP's) policy. QoS guarantees are important when network capacity is limited, for example in cellular data communications networks, for real-time streaming multimedia applications, in voice over IP (VoIP) applications, and Internet Protocol (IP)-TV, as these applications require fixed bit rates and are delay sensitive.

Network customers and providers typically enter guarantees into a contractual Service Level Agreement (SLA). An SLA defines metrics that a service provider must meet for performance, throughput, and latency limits based upon mutually agreed upon minimum levels. The QoS levels for offsite and remote users accessing a corporate or organization network are limited to user's respective home service SLAs, and these SLAs typically do not guarantee the same QoS levels that the users would otherwise enjoy while they are connected to the organization's network.

QoS is usually achieved by prioritizing network traffic. For example, a network or protocol that supports QoS may agree on a traffic contract with application software and reserve capacity in the network's nodes, for example when a network session is being established. During the network session, the network may monitor the achieved level of performance, for example the data transfer rate and delay, and dynamically control scheduling priorities in the network's nodes. The network may release any reserved capacity during a tear down phase when the session is terminating.

QoS comprises all the aspects of a connection, such as time to provide service, voice quality, echo, loss, reliability and so on. A subset of telephony QoS is Grade of Service (GOS), which comprises aspects of a connection relating to the capacity of a network.

When a user accesses a virtual private network (VPN) (e.g., by logging onto a VPN client via an Internet service provider or wireless service provider), the user is typically authenticated by the network. As part of the authentication process, a decision is made as to whether the user is allowed to access the VPN.

There is an increasing need for flexible connection rates and guaranteed QoS levels for remote and home office workers who connect to corporate and organization networks via VPNs. Offsite network services that an organization's employees use are increasing in complexity and are also driving increased bandwidth requirements. Due to these demands, organizations cannot currently efficiently manage and control the quality of connections into their networks from remote client devices. Furthermore, organizations cannot readily guarantee the same QoS for offsite and remote users accessing the organization's network via a VPN that users directly connected to the network have.

When users access an organization's VPN from homes, hotels, and other remote sites, QoS metrics such as connection rate, bandwidth, network latency, maximum upload/download data transfer rates, and the maximum amounts of data that can be uploaded and/or downloaded during a session are limited by the account used to access the VPN. Unless a user's personal account has an SLA that meets or exceeds the SLA of their organization, connections to their organization's VPN via a user's personal account will be inferior (i.e., slower, higher-latency, limited throughput, limited upload/download data transfer rates, etc.).

Therefore, what is needed are systems, methods, and computer program products for providing dynamic QoS for VPNs. What is further needed are systems, methods, and computer program products that dynamically boost a remote user's connection to match the QoS of a VPN to which a user is connecting.

What is also needed are systems, methods, and computer program products that enable network usage and connection time to be attributed and billed to an organization when a user accesses the organization's VPN remotely.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 5:
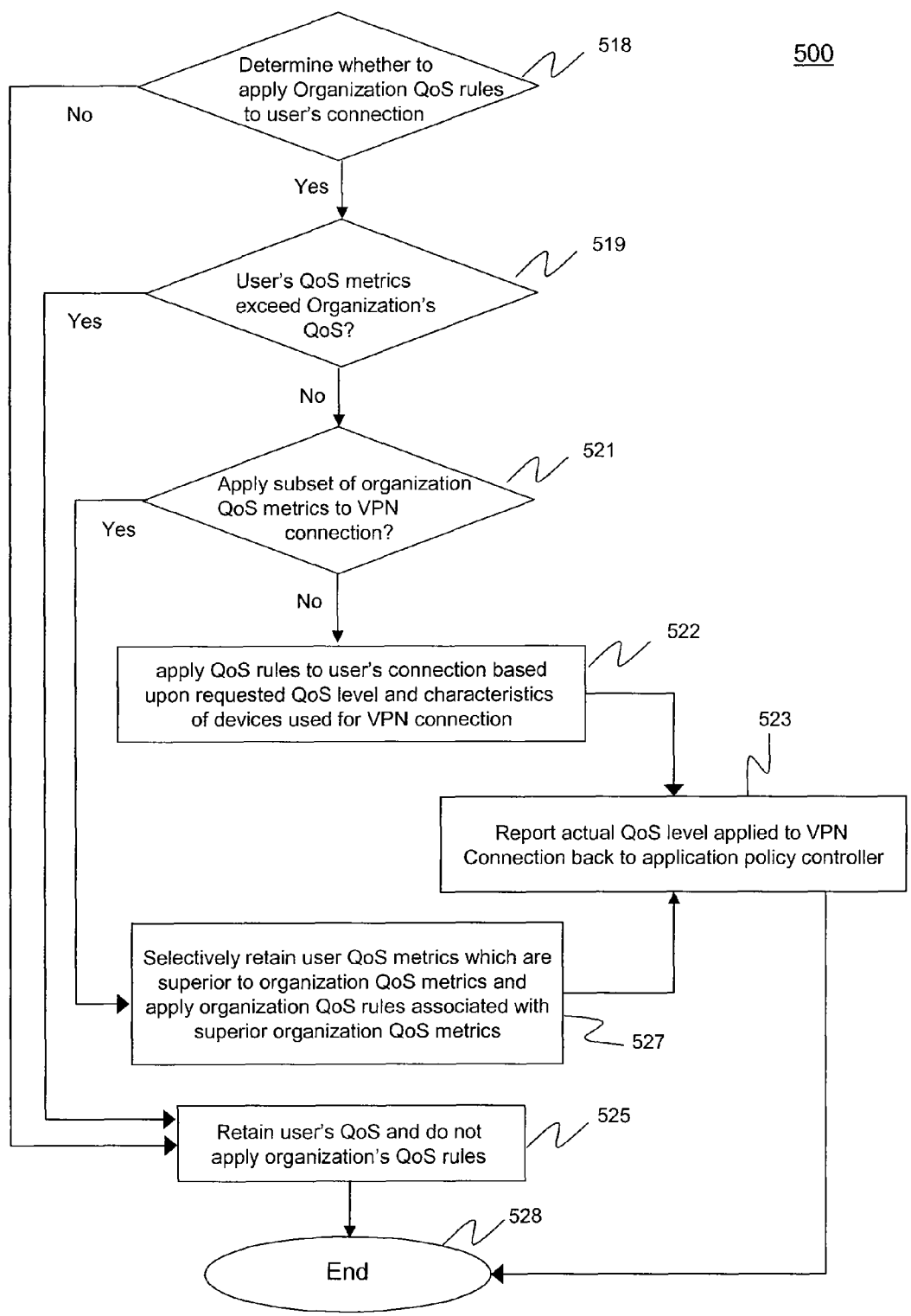

FIG. 5 provides a flowchart of a method for determining whether to apply dynamic QoS to VPN connections, according to an embodiment of the invention.

Figure 6:
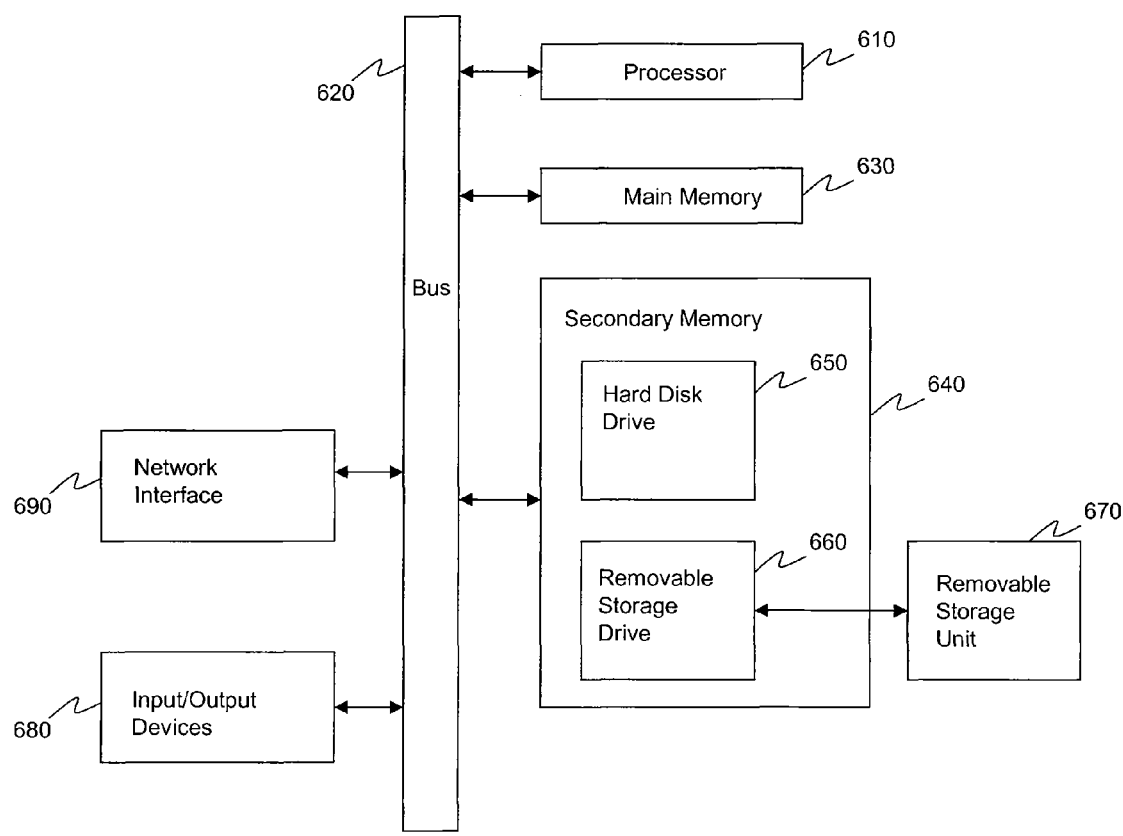

FIG. 6 is a diagram of a computer system on which the methods and systems herein described can be implemented, according to an embodiment of the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Overview

Systems and methods for the dynamic enhancement of QoS to correlate to the QoS for an organization network are described next. In one embodiment of the present invention, dynamic QoS changes for a device may include one or more of temporarily increasing bandwidth made available to a device, increasing maximum data throughput rates for a device, applying session control checks of organization network to users of a device, and/or increasing network usage limits for a device (i.e., maximum amount of data upload/download allowed during a session). For example, the usage limits for a device may be a maximum amount Gigabytes (GBs) that can be uploaded and/or downloaded during a VPN connection session. In an embodiment, an application policy controller applies rules which regulate when a dynamic 'VPN boost' can occur. For example, an application policy controller may apply rules which regulate the durations of VPN boosts for a device and the days of week and/or times of day VPN boosts can occur for a device. The rules applied by a QoS module on an application policy controller are dynamically tunable based on total available bandwidth for organization network 274 and/or total number of enhanced ('boosted') VPN connections into organization network 274.

Figure 1:
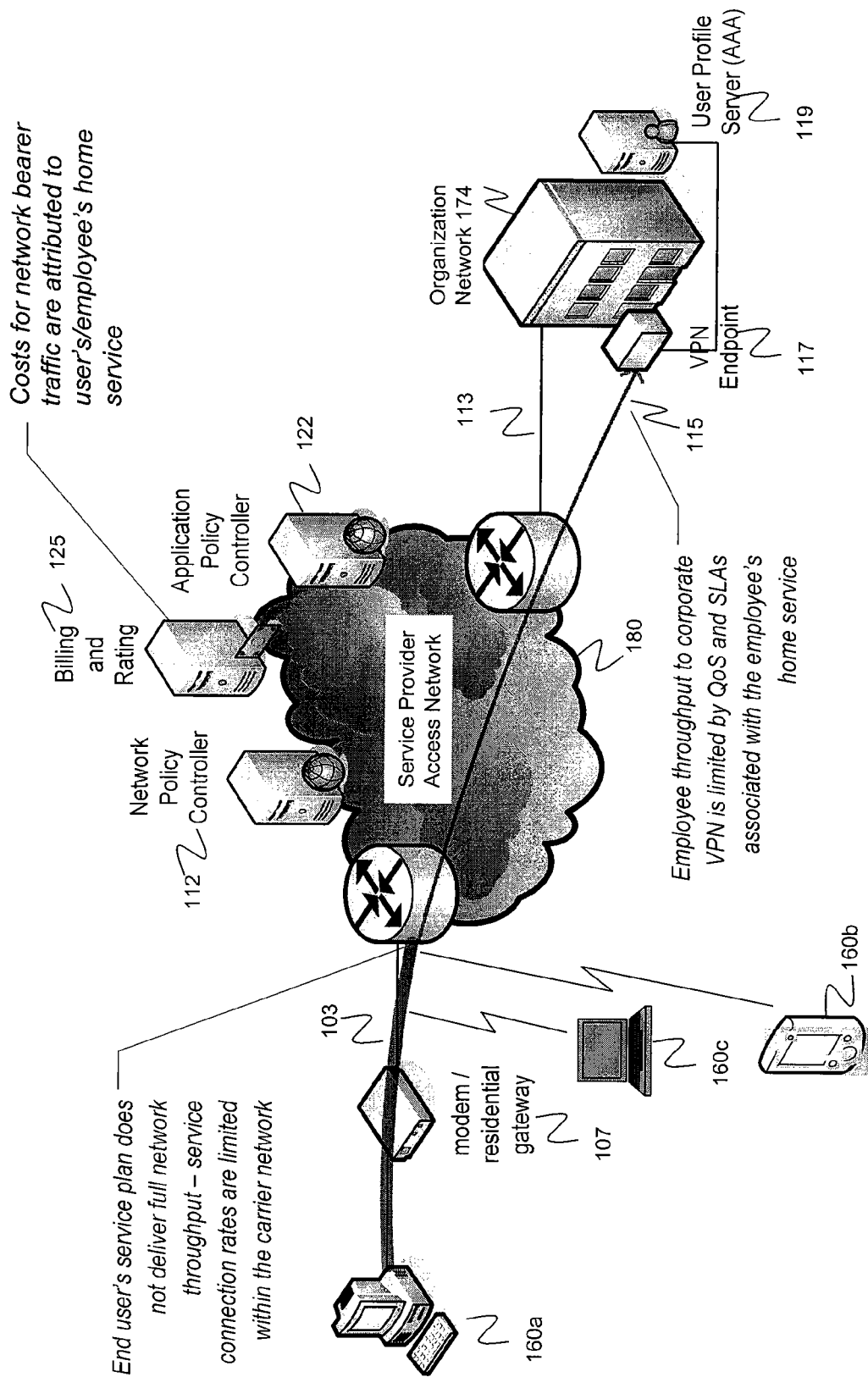
FIG. 1 illustrates a scenario for connections to an organization's network from remote devices, as is currently known in the art.

FIG. 1 depicts a typical flow of connections 100 from remote client devices 160a-c to an organization's network 174 via service provider access network 180. FIG. 1 illustrates how corporate and organization VPNs are currently limited by the connection rate that home/remote users have subscribed for their personal accounts. Because of these limitations, offsite and remote end users cannot obtain the same QoS for their VPN connections that they would otherwise enjoy on their organization's network. In order to guarantee a specific QoS for organization and corporate VPN functions, organizations and corporations either have to pay for the home connections of their remote users and employees, or insist that their remote users and employees pay for an appropriate QoS themselves.

Wired device 160a may establish connections to service provider network 180 by a variety of techniques. For example, wired device 160a can establish a connection 103 to service provider access network 180 via a modem/residential gateway 107. Wireless devices 160b and 160c may establish a connection 103 to service provider access network 180 via known wireless access techniques.

The network throughput available to end users of devices 160a-c may not support the full bandwidth available from service provider network 180 or corporate network 174 as the connection rates for devices 160a-c are limited within service provider network 180 depicted in FIG. 1. In the example of FIG. 1, end users of devices 160a-c (e.g., employees of an organization hosting organization network 174) have limited throughput along connection 115 to the organization's VPN. This is because throughput for connection 115 is limited to the QoS and SLAs associated with the end user's respective home services for devices 160a-c. Connection 115 is used for bearer traffic between devices 160a-c and organization network 174 that is sent via service provider network 180.

After users of devices 160a-c establish connection 115 to organization network 174 by establishing a connection with VPN endpoint 117 via service provider network 180, VPN end point 117 then validates received VPN credentials against information stored in a user profile server 119 (e.g., an internal corporate or organization authentication, authorization, and accounting/AAA server). At this point, organization network 174 establishes connection 113 with service provider network 180 so that application policy controller 122 can determine whether user profile server 119 is a valid client for the application policy controller's carrier network. Connection 113 is used for control traffic sent from organization network 174 to service provider network 180. VPN endpoint 117 may be an edge router for organization network 174, and it sends control information to application policy controller 122 via service provider network 180 so that application policy controller 122 can validate user profile server 119.

After user profile server 119 successfully validates VPN credentials for devices 160a-c, connection 113 is established via service provider network 180. Costs associated with connection 113 are attributed by billing and rating server 125 back to the home service/accounts of users of devices 160a-c. In the scenario depicted in FIG. 1, application policy controller 122 and network policy controller 112 do not guarantee that the QoS for organization network 174 is applied to connection 113 for end users of devices 160a-c.

2. Structural Embodiments

Figure 2:
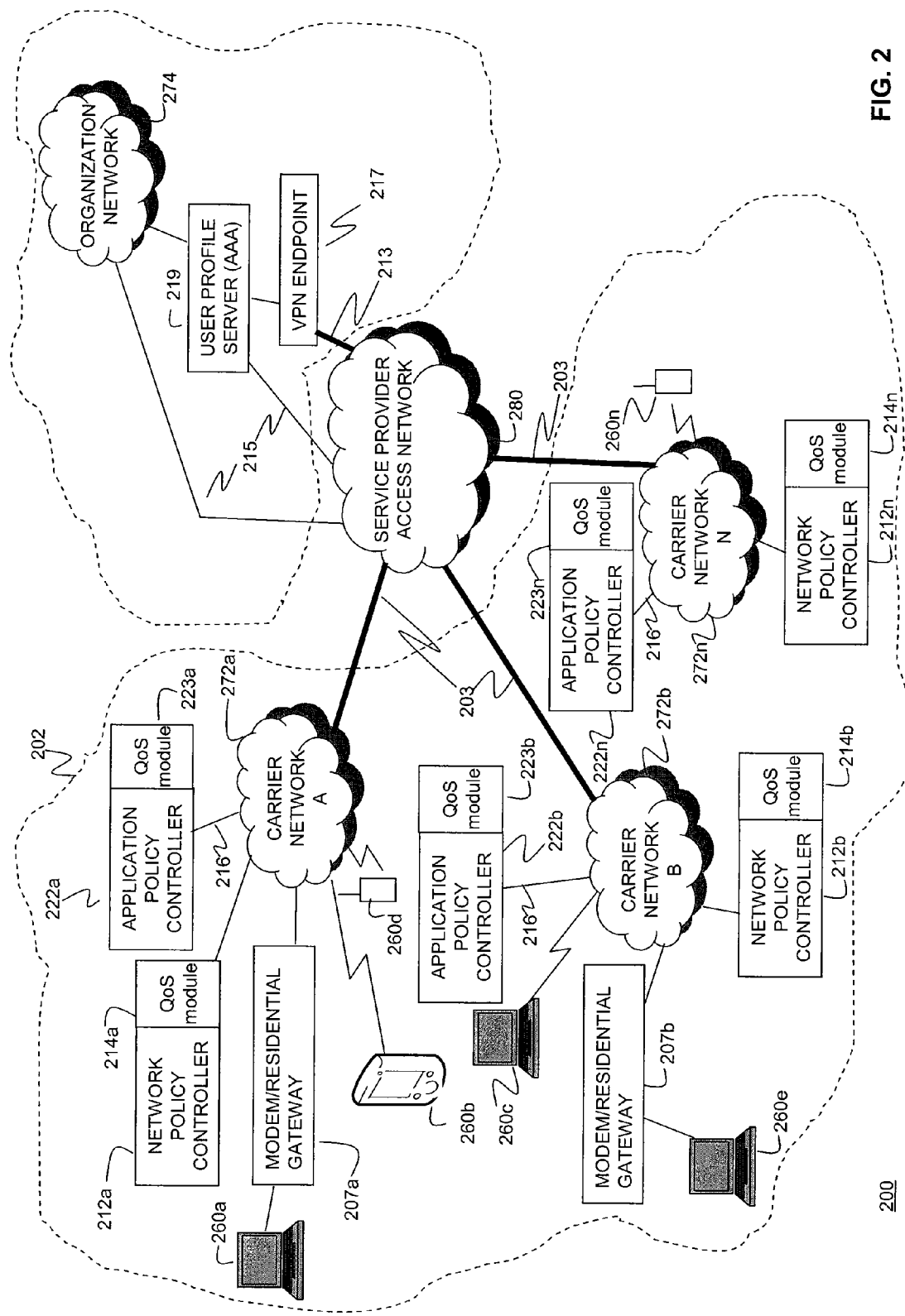
FIG. 2 is a diagram of an exemplary operating environment for a system for providing dynamic QoS for VPNs, according to embodiments of the present invention.

FIG. 2 is a block diagram of an exemplary operating environment 200 for a system for providing dynamic QoS for users connecting to a virtual private network (VPN), according to embodiments of the present invention. Exemplary operating environment 200 includes a service provider infrastructure 202, a service provider access network 280, and organization network 274. Organization network 274 is merely associated with the organization and is optionally hosted by another organization, corporation, or service provider.

Although only one service provider infrastructure is depicted, operating environment 200 may include any number of service provider infrastructures. although only one service provider access network 280 is depicted, operating environment 200 may include any number of service provider access networks. Similarly, although only one organization network 274 with a VPN endpoint 217 is depicted, operating environment 200 may include any number of organization networks, including, but not limited to corporate, government, and other organization networks with virtual private networks (VPNs).

Exemplary service provider infrastructure 202 includes one or more carrier networks 272a-n. Carrier networks 272*a-n* may be any type of public or private communication network including, but not limited to, a wireline network, a wireless telecommunication and/or data network (e.g., TDMA, CDMA, GSM, Wi-Fi, or WiMax networks). Networks 272*a-n* each include one or more network policy controllers 212*a-n* and one or more application policy controllers 222*a-n*. At a high level, application policy controllers 222*a-n* manage access to applications and services in real time on a per-user basis for devices 260*a-n* whereas network policy controllers 212*a-n* apply QoS levels that manage QoS metrics such as bandwidth, latency, upload/download data transfer rates, and maximum amount of data that can be uploaded/downloaded on a per-session basis for devices 260*a-n*.

Application policy controller 222 is configured to apply rules which regulate the type and timing of dynamic QoS changes for device 260 based on the QoS of organization network 274 instead of the QoS for a user of device 260. For example network elements can be adjusted such that the QoS provided to a user of device 260*a* meets the bandwidth and QoS requirements specified in the SLAs associated with the organization, not the end user of device 260*a*. In an embodiment, this is accomplished using network policy controller 212 and application policy controller 222 functions.

Application policy controllers 222*a-n* are repositories for user profiles relating to application accessed by users of devices 260*a-n*. Application policy controllers 222*a-n* may also be configured to deliver a single platform for subscriber (user) management and provisioning that enable the rapid launch of new applications and content on devices 260*a-n*. Application policy controllers 222*a-n* may also store organizational rules regarding the type of connection and QoS level a given user is entitled to. Application policy controllers 222*a-n* also provide a level of abstraction regarding mapping the QoS levels corresponding to the organization affiliated with organization network 274 to the QoS levels requested for specific VPN connections. These rules may be based on the user's role within the organization affiliated with organizational network 274, the time of day, the day of week, and/or other factors. For example, a premium or 'gold level' QoS may be requested for user with an 'executive'-level role, a medium or 'silver level' QoS may be requested for a user with a 'technical-support' role, and a low or 'bronze' level QoS may be requested for a user with a 'staff-level role. Application policy controller functions can be performed by one or more servers configured to perform the functions described in the following paragraphs.

Application policy controllers 222*a-n* provide a level of security regarding who is making connections to networks 272*a-n*. Application policy controllers 222*a-n* are also responsible for validating user profile server 219 in order to determine if user profile server 219 is a valid client for carrier networks 272*a-n*.

Application policy controllers 222*a-n* include QoS modules 223*a-n* that are configured to dynamically provide users of devices 260*a-n* with content and applications from any source, including organization network 274, and extend policy control over user interaction with these applications. QoS module 223 on application policy controller 222 is configured to send a message to network policy controller 212 identifying the user and the IP address used by/assigned to device 260. The message from QoS module 223 on application policy controller 222 to network policy controller 212 contains the IP address for device 260 being used by a user to connect to organization network 274 along with the organization QoS to be applied. For example, the IP address of device 260*a* used to connect to organization network 274 via carrier network 272*a* is provided to network policy controller 212*a* via a message from application policy controller 222*a* together with the level of the organization QoS to be applied to device 260*a*. In this way, application policy controllers 222*a-n* enable service provider network 280 to create flexible, targeted services in pace with user demand while retaining control of the VPN connections of devices 260*a-n*. QoS modules 223*a-n* may also be configured to set QoS objectives based on time-of-day, day-of-week, and/or location of devices 260*a-n*. The QoS objectives set by application policy controllers 222*a-n* may be expressed as rules/policies to be enforced by network policy controllers 212*a-n*. Application policy controllers 222*a-n* provide network policy controllers 212*a-n* with identification of connections from devices 260*a-n* or modems/gateways 207*a-b* (e.g., an IP address) along with the level of QoS to be applied to the respective VPN connections for devices 260*a-n*. This connection identification is used by network policy controllers 212*a-n* to map a requested QoS level to an actual network line, circuit, and/or port used by modem/residential gateways 207*a-b* and/or devices 260*a-n*. According to an embodiment, network policy controllers 212*a-n* report the actual QoS levels that were applied to the connections back to the requesting application policy controller 222*a-n*. Application policy controllers 222*a-n* may then report the applied QoS level information back to organizational network 274 via VPN endpoint 217. For example, a high or 'gold' level QoS with specific upload/download data transfer rates and maximum bandwidth may be requested via application policy controller 322 for a VPN connection for device 260*a* via modem/residential gateway 207*a*, but due to physical limitations of device 260*a* and 207*a*, this 'gold' level QoS may not be feasible.

Devices 260*a-n* in service provider infrastructure 202 access carrier networks 272*a-n* via wireline or wireless communication protocols. For example, wired devices 260*a* and 260*e* may access carrier networks 272*a* and 272*b*, respectively via modem/residential gateways 207*a* and 207*b*. Modem/residential gateways 207*a* and 207*b* may be any type of network gateway, including, but not limited to, a cable modem, an ISDN gateway, a digital subscriber line (DSL) gateway, a wireless router, and/or other customer premises equipment (CPE) used to connect devices 260*a* and 260*e* to carrier networks 272*a* and 272*b*.

Devices 260*a-n* may be any type of wired or wireless communication devices including, but not limited to, personal digital assistants (PDAs), mobile computers, BlackBerry® devices, Palm® devices, Pocket PCs, Smartphones, hand held computers, laptop computers, tablet PCs, ultra-mobile PCs, laptops, tablet computers, servers, or any similar devices with communication capabilities. Devices 260*a-n* are configured to access one or more carrier networks 272 in their home service provider infrastructure (e.g., service provider infrastructure 202). In addition, devices 260*a-n* may be configured to access one or more networks in a third party service provider infrastructure (commonly referred to as "roaming").

As will be understood by one skilled in the art, the present invention can be implemented when there are roaming agreements between carrier networks 272*a-n*. Devices 260*a-n* may also include software and/or hardware for accessing applications deployed in their home service provider infrastructure and/or a third party service provider infrastructure.

Network policy controllers 212*a-n* are configured to enforce network policies for users connected to carrier networks 272*a-n* and to interact with devices 260*a-n* after the users and/or devices 260*a-n* have been authenticated to carrier networks 272*a-n*. For example, connection throughput and other QoS metrics for user devices 260*a* and 260*b* for carrier network 272*a* are controlled by network policy controller 212a. Network policy controller functions can be performed by one or more servers configured to perform the functions described in the following paragraphs.

According to an embodiment, network policy controllers 212a-n each contain a rules repository and a session state repository. In their respective session state repositories, network policy controllers 212a-n store information about the actual devices, circuits, ports, and lines used for each active session on their respective carrier networks. Application policy controllers 222a-n may be used in conjunction with network policy controllers 212a-n to implement the business policy decisions concerning subscriber access to applications. These policy decisions may be reduced to a set of one or more rules, each of which can be expressed in a standardized format. That standardized format captures the two elements of a rule, namely the union of a condition with an action. If the condition is satisfied, then one or more actions are taken. Use of such a standardized format ensures that a session management system has considerable flexibility in terms of the types of rules, and therefore the business policy decisions, that may be implemented in a communications network. For example, by using such a broad format, a network provider can provide a solution that manages bandwidth, access to network elements, and QoS to subscribers on a per-subscriber, per-session basis.

Conditions provide a result based upon information from such sources as the communications network information, external information (e.g. time of day and day of week), and subscriber information. Subscriber information used can include subscriber profile information (static information such as the identity of the subscriber, service tier within the subscriber agreement, etc.), subscriber state information (dynamic information such as the device used by the subscriber, the date of requested access, the location of the subscriber), and subscriber historical information (e.g. usage information, preferences, etc.).

QoS modules 214a-n residing on network policy controllers 212a-n may apply QoS levels to connections based on the characteristics of modems/residential gateways 207a-b and/or devices 260a-n and the requested QoS levels routed from application policy controllers 222a-n. Further, network policy controllers 212a-n centralize the management of user experience in relationship to the respective resources of carrier networks 272a-n using network policy control. In this way, network policy controllers 212a-n enable the creation of business rules defined by user information and preferences, application definition, and respective resource allocation for carrier networks 272a-n.

QoS modules 214a-n on network policy controllers 212a-n apply QoS controls to organization network 274 resources and offer bandwidth-on-demand service upgrades in real time such as 'VPN boosts' and service-tier upgrades. Network policy controllers 212a-n also differentiate content services with QoS guarantees or prioritization. For example, network policy controller 212a can apply QoS levels by service tier, and can also set and enforces bandwidth thresholds for users of devices 260a, 260b, and 260d in real time.

QoS module 214a on network policy controller 212a interacts with operations and business support systems in organization network 274 when changes to QoS levels are requested for users of devices 260a, 260b, and/or 260d. In an embodiment, mid-session changes to a QoS level may be requested by organization network 274 via signal 216 sent to application policy controller 222a. When a mid-session QoS change is requested by organization network 274 for a VPN connection, a signal including at least the IP address, the organization identifier, and QoS level information is sent to carrier network 272a via connection 215 to service provider network 280. QoS module 223a on application policy controller 222a maps the requested QoS level to QoS metrics and then forwards the IP address and requested QoS metrics to network policy controller 212a. QoS module 214a on network policy server 212a is configured to map the IP address and requested QoS metrics to specific lines, circuits and ports used by connections for devices 260a, 260b, and 260d. QoS module 214a then determines the actual QoS metrics that are achievable for the devices 260a, 260b, and 260d. In this way, QoS modules 214a-n provide immediate service response and instant control over bandwidth usage for devices 260a-n. QoS modules 214a-n are configured to allow for on-demand options such as VPN bandwidth increases, service tier increases for specific target user groups, and content-triggered QoS adjustments requested by organization network 274 for devices 260a-n.

Network policy controllers 212a-n may incorporate standards-based Policy Control and Rating Function (PCRF) as defined by the 3rd Generation Partnership Project (3GPP), telecoms and Internet converged services and protocols for advanced networks (TISPAN), 3GPP2, and the Policy Function defined by the WiMAX Forum. Network policy controllers 212a-n integrate session information from remote authentication dial in user service (RADIUS), Diameter, dynamic host configuration protocol (DHCP), and other similar protocols, and allow service provider network 280 to apply security controls to connections to from devices 260a-n.

Organizational network 274 includes a VPN endpoint 217 and a user profile server 219. In accordance with an embodiment of the present invention, user profile server 219 receives access-request messages from VPN endpoint 217 and authenticates requests based on knowledge user profile server 219 has of credentials supplied by users of devices 206a-n. According to another embodiment, VPN endpoint 217 authenticates access request messages against a Lightweight Directory Access Protocol (LDAP) repository, and a trigger in the LDAP repository causes a policy to be pushed or sent to application policy controller 222. Alternatively, in another embodiment, VPN endpoint 217 may consult an internal data store to authenticate and authorize the requested connection and then send a message to application policy controller 222 via a callout interface. The format of an access request message is dependent upon the protocol being used for authentication and authorization of a user. Examples of authentication and authorization protocols include DHCP, RADIUS, Diameter, and terminal access controller access control system (TACACS). As would be appreciated by persons of skill in the art, any type of authentication and/or authorization protocol or technique could be used with the present invention.

User or device authentication may be based on a user ID, name, password, and/or Internet Protocol (IP) address associated with the user's device. The IP address need not be static or permanently assigned to a device, and can be assigned dynamically at the time the device connects to network 272. The IP addresses for devices 260a-n can be assigned by modems/residential gateways 207a-b or carrier networks 272a-n and associated with devices 260a-n while they are connected to the network via known methods and protocols such as DHCP.

Bearer traffic from service provide network 280 will typically come through VPN endpoint 217 via connection 213 and control traffic will typically go from organization network 274 to service provider network 280 via connection 215.

Unless specifically stated differently, a user is interchangeably used herein to identify a human user, a software agent, or a group of users and/or software agents. Besides a human user who needs to connect to an organization's VPN, a software application or agent running on a device sometimes needs to access an organization's VPN. Accordingly, unless specifically stated, the term "user" as used herein does not necessarily pertain to a human being.

VPN endpoint 217 is configured to validate VPN credentials for users of devices 260a-n. VPN credentials may be validated against user profile server 219. VPN endpoint 217 is not necessarily the gateway into organization network 274, and VPN endpoint may be an external device with an external IP address outside of organizational network 274.

User profile server 219 may support any type of user access control and/or authentication. For example, user profile server 219 may be a server that performs authentication, authorization, and accounting (AAA) services. In an embodiment, user profile server 219 supports RADIUS or DIAMETER. In an embodiment of the present invention, user profile server 219 is an authentication, authorization, and accounting (AAA) server.

Service provider access network 280 may be a portion of one or more carrier networks 272a-n or a separate network.

3. Methods

Figure 3:
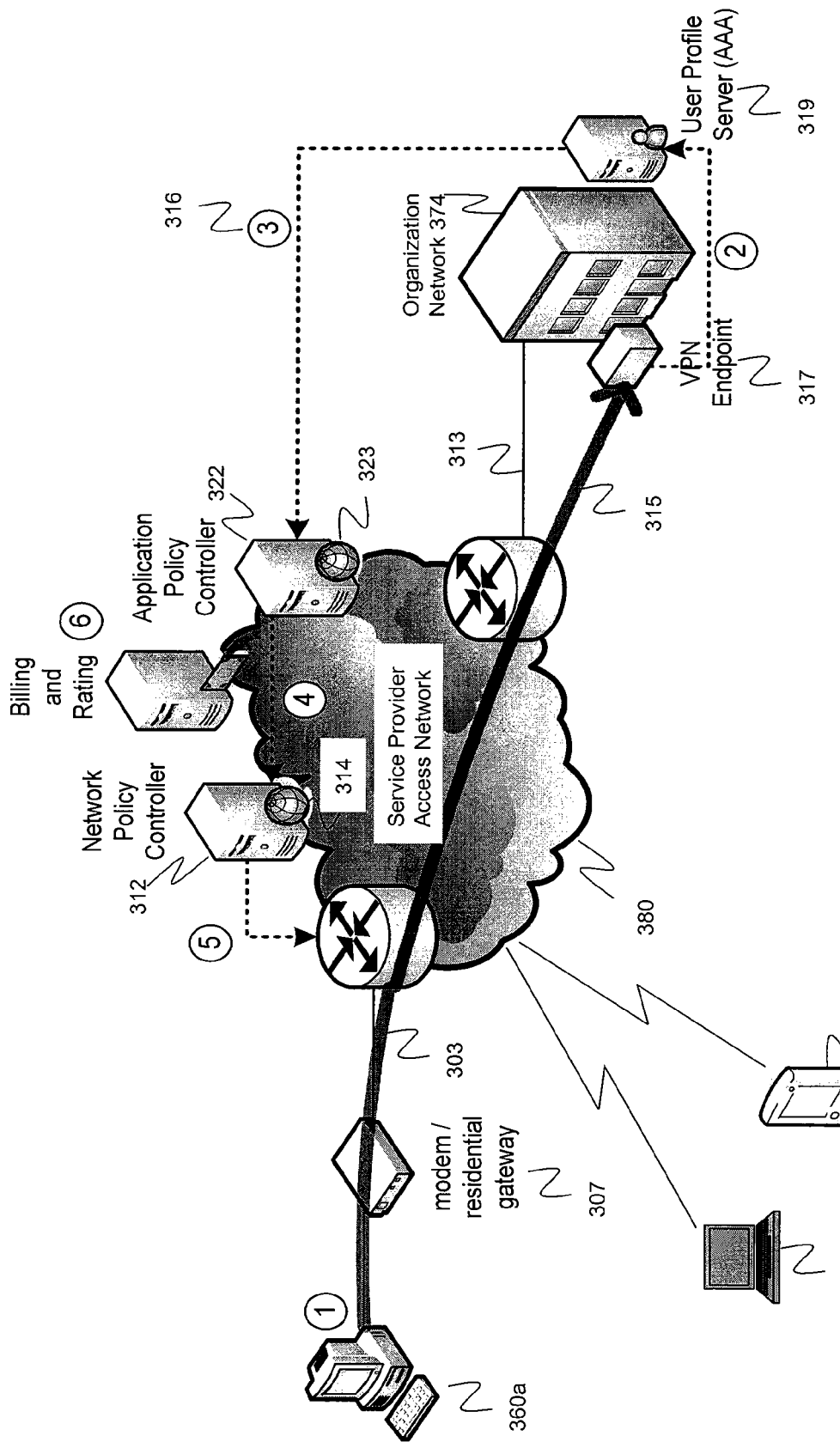
FIG. 3 depicts an example of providing dynamic QoS for VPNs, according to embodiments of the present invention.
Figure 4:
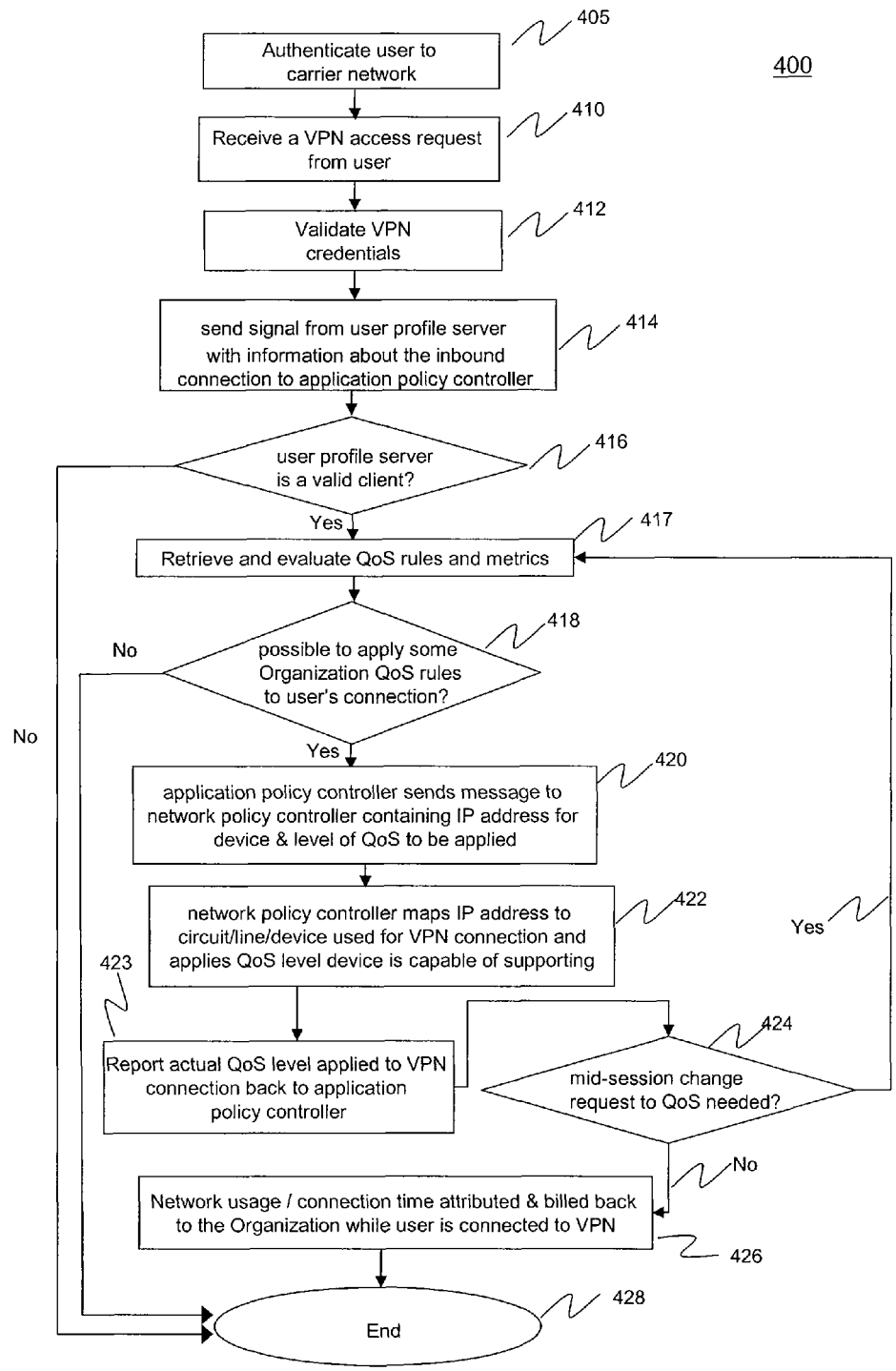
FIG. 4 is a flow chart of a method for providing dynamic QoS for VPNs, according to embodiments of the present invention.

FIG. 4 is a flow chart 400 of a method for providing dynamic QoS for VPNs, according to embodiments of the present invention. FIG. 3 depicts an exemplary network configuration for providing dynamic QoS, according to embodiments of the invention. FIG. 4 is described with continued reference to the embodiments illustrated in FIG. 3. However, FIG. 4 is not limited to that embodiment. Note that the steps in flow chart 400 do not necessarily have to occur in the order described.

In step 405, an end user accesses his service provider network 380 via device 360a and is authenticated to service provider network 380. In step 405 the IP address of user client device 360 is known. As would be appreciated by persons of skill in the art, the IP address of user client device 360 may be static or assigned dynamically by the DHCP protocol or another process.

In step 410, the end user attempts to establish a VPN connection with organizational network 374 through his service provider network 380. For example, requests for VPN connections from users of devices 360a-c are received by VPN end point 317. VPN end point 317 is associated with organization network 374.

In step 412, VPN credentials are validated. For example, the VPN end point 317 may validate VPN credentials against a user profile server 319. According to one embodiment, user profile server 319 can be an internal corporate or organization AAA server. For example, VPN credentials received from the end user and/or end user device during a VPN connection request in step 410 are routed to user profile server 319 in step 412. In this step, VPN connection 313 is established via service provider access network 380.

In step 414, information about the inbound connection is communicated to a designated application policy controller 322 in service provider network 380. In an embodiment, user profile server 319 communicates the information to application policy controller 322. In an alternative embodiment of step 412, VPN endpoint 317 communicates with an application policy controller 322. Information about the inbound VPN connection includes at least the IP address assigned to the user's Customer Premises Equipment (CPE) (e.g., the user's computer and/or modem/residential gateway 307), information uniquely identifying the organization (i.e., an organization identifier) affiliated with organization network 374, and information identifying a requested QoS level.

For example, user profile server 219 sends signal 216 via connection 213 or 215 to application policy controller 222a for carrier network 272a. Signal 216 contains information about the inbound connections for devices 260a and 260b. According to an embodiment, signal 216 is sent from VPN endpoint 217 via connection 213. According to an alternative embodiment, signal 216 is sent from user profile server 219 via connection 215. In an embodiment, signal 216 includes the IP addresses assigned to wireless devices 260a and 260b, the VPN credentials for the VPN connections requested by devices 260a and 260b, and an organization identifier, wherein the organization identifier uniquely identifies the organization associated with organization network 274.

VPN endpoint 217 may establish a direct connection with application policy controller 222b, without using intermediary user profile server 219. For example signal 216 may be sent directly from VPN endpoint 217 to application policy controller 222b via connection 213 in order to provide information about inbound connections for wired devices 260e and wireless device 260c. Connection 213 from VPN endpoint 217 may include signal 216 that is routed to application policy controller 222b via service provider network 280 and carrier network 272b. The signal provides information about inbound connections for modem/residential gateway 207b used by wired device 260e to connect to carrier network 272b. Signal 216 may also be routed from user profile server 219 to access policy controller 222a via connection 215 to service provider network 280 through carrier network 272a. For example, signal 216 contains information about inbound connections for modem/residential gateway 207a used by wired device 260a to connect to carrier network 272a. Modem/residential gateway 207a is a client device that holds the IP address for mobile client device 260a. Similarly, modem/residential gateway 207b has the holds the IP address for mobile client device 260e. As would be appreciated by persons of skill in the art, the IP addresses of user client device 260a and 260e may be static or assigned dynamically by the DHCP protocol or another process.

In step 416, application policy controller 322 authenticates user profile server 319 to determine whether it a valid client.

If it is determined in step 416 that user profile server 319 is not a valid client, then the method ends in step 428. If it is determined in step 416 that user profile server 319 is a valid client, then control is passed to step 417.

In step 417, QoS module on application policy controller 322 retrieves and evaluates QoS rules regulating the QoS for a user connection. QoS rules are retrieved after signal 316 is received by application policy controller 322. After application policy controller 322 receives signal 316, QoS module 323 is configured to retrieve rules that regulate the QoS level for devices 360a-c. Signal 316 includes at least the IP address of the device and an organization identifier which uniquely identifies the organization associated with organization network 374. In an embodiment, signal 316 may also include information identifying the user's role within the organization associated with organization network 374. In this step, application policy controller 322 accesses rules that regulate when an alternation of the QoS level for a device should be made. These QoS rules may be stored in a database that stores QoS profiles for organization, wherein the database is accessible from application policy controller 322, or a data store local to application policy controller 322. The QoS rules may regulate the time of day or day of week that a VPN alteration can occur for a devices, the maximum number of boosted connections organization network 374 can have, and/or session admission control checks for devices 360a-c. For example, a rule may indicate that when the organization's QoS exceeds the QoS associated with the user's home or remote connection established in step 405, then the organization's QoS rules are applied to the user's connection and control is passed to step 420. The rules may further indicate that QoS levels should only be boosted during the normal working hours for the corporation. QoS module 323 is further configured to map or relate user connections to the organizations associated with the organization network users are connected to. In step 417, QoS metrics associated with the user's connection are retrieved by QoS module 323. QoS metrics may include availability, bandwidth, latency, and delay for the connection. QoS metrics associated with the organization are also retrieved by the QoS module in step 417.

During the evaluation process of step 417, QoS metrics associated with the user connection and the organization are compared to determine which attributes are superior. After QoS rules and attributes for the user connection are retrieved and evaluated, control is passed to step 418.

In step 418, a determination is made whether to apply the organization's QoS rules to the user's connection. At this point, the network throughput available to end users of devices 360a-c along connection 313 is limited to the bandwidth available from service provider network 380. In this step, QoS module 323 on application policy controller 322 determines whether the organization's QoS will be applied to the user connection. When it is determined in step 418 that the organization's QoS rules retrieved in step 417 are to be applied to the connection, QoS module 314 on network policy controller 312 applies the rules and regulates when a Dynamic QoS boost or enhancement can occur for connection 315.

According to an embodiment of the invention, the organization's QoS rules are applied in step 418 when the organization's QoS metrics retrieved in step 417 exceed the user's QoS metrics. The method of determining whether to apply the organization's QoS rules to a given user's connection is depicted in greater detail in FIG. 5.

If the organization's QoS rules are to be applied to a connection, the rules retrieved in step 417 are applied in step 418 to change QoS metrics for connection 315. For example, QoS module 323 resident on application policy controller 322 may apply rules to control the time of day when VPN 'boosts' can occur for a specific organization affiliated with organizational network 374. QoS module 323 may also request a QoS level for connection 315 based upon optional rules regarding the service level agreements (SLAs) for the organization affiliated with organizational network 374, organizational roles for users of remote devices 360a-c, the maximum number of boosted connections organization network 374 can have, and/or session admission control checks for users of devices 360a-c.

If it is determined in step 418 that the organization's QoS rules will not be applied to the connection, then the method ends in step 428.

In step 420, application policy controller 322 sends a message to network policy controller 312 containing the addresses associated with the connection and a proposed QoS level. Information about client device 360 includes at least the IP address being used by device 360. The network policy controller then obtains the circuit and line information obtained in order to determine which connection to apply an organizational QoS to. The IP address in the message sent by application policy controller 322 in step 420 is then used by network policy controller in step 422 to determine precisely which connection to apply a QoS boost to.

In step 422, network policy controller 312 uses the IP address received from application policy controller 322 in step 420 to resolve the internal session state of connection 313 used by device 360. The session state information is used in turn to determine the port number and client device 360 and modem/residential gateway 307 hosting connection 315 requested in step 410. In this step, network policy controller 312 maps the IP address provided in step 420 by application policy controller 322 to the vendor, model number, hardware capabilities, and port number for a connection from device 360 through modem/residential gateway 307. In this way, network policy controller 312 determines the actual limits for boosting a VPN connection the circuit and line used by modem/residential gateway 307 to connect device 360 to service provider network 380. In step 422, QoS module 314 on network policy controller 312 may retrieve information about the internal session state for a VPN connection requested in step 410 in order to determine characteristics of modem/residential gateway 307 used by device 360 hosting the user's connection to organization network 374, information uniquely identifying the user (i.e., user ID and/or VPN credentials), an organization identifier that uniquely identifies the organization associated with organization network 374, and what level of QoS boost can actually be achieved for modem/residential gateway 307. The session state information retrieved by the QoS module on network policy controller 312 may be stored in a local or remote database or in a data store local to network policy controller 312. This session state information is then mapped to the IP address and requested QoS level sent by application policy controller 322 in step 420. After session state information is retrieved by network policy controller 312, the process ends in step 426. In step 422 network policy controller 312 may also use its knowledge of the internal session state to determine the policy enforcement point via methods such as broadband remote access server (BRAS) and deep packet inspection (DPI) that regulate the throughput for connection used by modem/residential gateway 307 and device 360. Step 422 completes when QoS rules corresponding to organization network 374 are applied to the VPN connection requested in step 410. In an embodiment, if network policy controller 312 is unable to fully effectuate a QoS boost for connection 315 (i.e., due to physical limitations of the connection from device 360 via modem/residential gateway 307), network policy controller 312 may send a message back to application policy controller 322 indicating that the requested QoS was not able to be fully applied to connection 315. For example, a QoS boost requesting increased bandwidth and upload/download data transfer rates and limits may have been requested in step 420, but if the requested data transfer rates and limits are unachievable due to hardware characteristics of modem/residential gateway 307 and/or device 360, network policy controller 312 may boost connection 315 as much as the circuit/line used for the connection can support, and then report back the inability to fully apply the requested QoS to application policy controller 322. In another embodiment, a report of the actual level of QoS that was applied to connection 315 may be reported back to VPN endpoint 317 via a message sent from network policy controller 312 through application policy controller 322.

In step 423, the actual QoS level that was applied to connection 315 by network policy controller 312 may be reported back to application policy controller 322 by network policy controller 312. In an alternative embodiment, an acknowledgment may be sent to application policy controller 322 by network policy controller 312. This step may also include reporting an error message to application policy controller 322 from network policy controller 312 if the QoS for connection 315 was not able to be enhanced due to physical characteristics of modem/residential gateway 307 or device

360. If connection 315 was not able to be boosted to the QoS guaranteed by SLAs for organization network 374, application policy controller 322 may route the actual QoS level to VPN endpoint 317 so that the organization affiliated with organizational network 374 is aware of connection 315's actual QoS level.

In step 424, an evaluation is made regarding whether a mid-session change in the QoS applied in step 422 is needed. For example, if corporate network 374 needs to 'rollback' the number of enhanced or boosted VPN connections due to bandwidth concerns, in step 424 a change request is generated.

If it is determined in step 424 that no QoS adjustment or change is needed, then the method continues with optional step 426.

If it is determined in step 424 that a QoS adjustment or change is needed, then a change request is generated including at least updated QoS rules and control is passed to step 418 where updated rules regulating when a Dynamic QoS adjustment can occur are applied and steps 420-424 are repeated.

In step 426, network usage and connection time associated with the VPN connection requested in step 410 is optionally attributed and billed back the organization hosting or affiliated with organization network 374. In an embodiment, in step 426, time and network usage is billed to organization while a user using device 360 is connected to the organization's VPN. In step 426, costs associated with the connection requested in step 410 are optionally attributed to organization network 374 by a billing and rating server. Execution of optional step 426 ensures that costs associated with the connection are billed to the user's organization and not the home or personal accounts of users of devices 360*a-c*.

The method ends in step 428 when no additional dynamic QoS boost or enhancement is needed for the VPN connection.

FIG. 5 is a flow chart 500 of a method for determining dynamic QoS for VPNs, according to embodiments of the present invention. FIG. 5 is described with continued reference to the embodiments illustrated in FIGS. 3 and 4. However, FIG. 5 is not limited to those embodiments. Note that the steps in flow chart 500 do not necessarily have to occur in the order described.

In step 518, a determination is made whether to apply the organization's QoS rules to the user's connection. If any of the organization's QoS metrics retrieved in step 417 exceed any of the QoS metrics for the user connection, control is passed to step 519 where it is determined whether to apply a subset of the organization's QoS metrics to connection 315. Conversely, when none of the of the organization's QoS metrics retrieved in step 417 exceed QoS metrics for the user connection, control is passed to step 525 where the user's QoS is retained. For example, if QoS metrics for availability, bandwidth, latency, delay, and other attributes for user connection 313 all exceed the QoS metrics associated with the organization, control is passed to step 525.

In step 519, it is determined whether to apply a subset of the organization's QoS metrics exceeding the user's QoS metrics to connection 315. In this step, QoS rules retrieved in step 417 that correspond to organization QoS metrics that exceed user QoS metrics for VPN connection 313 are determined. When a subset of the organization's QoS metrics are to be applied to connection 315 by selectively applying organization QoS rules and retaining a subset of the user's QoS metrics, control is passed to step 527. Otherwise, none of the user's QoS metrics associated with VPN connection 313 are retained, and control is passed to step 522.

In step 522, network policy controller determines to which degree the organization's QoS level retrieved in step 417 can be applied to the user's connection. In this step, the QoS level retrieved in step 417 is mapped to the specific line, circuit, and port used connection 315 by network policy controller 312. Due to limitations of modem/residential gateway 307 and/or device 360, the QoS level applied to connection 315 in this step may not equal the requested QoS level. After effectuating the requested QoS levels achievable by modem/residential gateway 307 and/or device 360, control is passed to step 523.

In step 525, the organization's QoS rules are not applied to connection 315 and the method ends in step 528.

In step 527, the user's QoS metrics which exceed the organization's QoS metrics are retained, as the user's superior attributes do not need to be 'boosted.' In this step, any organization QoS rules associated with superior organization QoS metrics that can be applied are applied to connection 315 and the control is passed to step 523.

In step 523, the actual QoS level that was applied to connection 315 by network policy controller 312 is reported back to application policy controller 322 by network policy controller 312. This step may include reporting an error message to application policy controller 322 from network policy controller 312 if the QoS for connection 315 was not able to be enhanced due to physical characteristics of modem/residential gateway 307 or device 360. If connection 315 was not able to be boosted to the QoS guaranteed by SLAs for organization network 374, application policy controller 322 may route the actual QoS level to VPN endpoint 317 so that the organization affiliated with organizational network 374 is aware of connection 315's actual QoS level. After reporting the actual, applied QoS level back to application policy controller 322, the method ends in step 528.

4. Computer System Implementation

In an embodiment of the present invention, the methods and systems of the present invention described herein are implemented using well known computers, such as a computer system 600 shown in FIG. 6. For example, the methods illustrated by flowcharts 400 and 500 of FIGS. 4 and 5 can be implemented in computer system 600. Computer system 600 can be any commercially available and well known computer or server capable of performing the functions described herein, such as computers available from Gateway, Apple, Sun, HP, Dell, Cray, etc.

Computer system 600 includes one or more processors (also called central processing units, or CPUs), such as processor 610. Processor 600 is connected to communication bus 620. Computer system 600 also includes a main or primary memory 630, preferably random access memory (RAM). Primary memory 630 has stored therein control logic (computer software), and data.

Computer system 600 may also include one or more secondary storage devices 640. Secondary storage devices 640 include, for example, hard disk drive 650 and/or removable storage device or drive 660. Removable storage drive 660 represents a floppy disk drive, a magnetic tape drive, a compact disk drive, an optical storage device, tape backup, etc.

Removable storage drive 660 interacts with removable storage unit 670. As will be appreciated, removable storage unit 660 includes a computer usable or readable storage medium having stored therein computer software (control logic) and/or data. Removable storage drive 660 reads from and/or writes to the removable storage unit 670 in a well known manner.

Removable storage unit 670, also called a program storage device or a computer program product, represents a floppy disk, magnetic tape, compact disk, optical storage disk, or any other computer data storage device. Program storage devices or computer program products also include any device in which computer programs can be stored, such as hard drives, ROM or memory cards, etc.

In an embodiment, the present invention is directed to computer program products or program storage devices having software that enables computer system 600, or multiple computer system 600s to perform any combination of the functions described herein Computer programs (also called computer control logic) are stored in main memory 630 and/or the secondary storage devices 640. Such computer programs, when executed, direct computer system 600 to perform the functions of the present invention as discussed herein. In particular, the computer programs, when executed, enable processor 610 to perform the functions of the present invention. Accordingly, such computer programs represent controllers of the computer system 600.

Computer system 600 also includes input/output/display devices 680, such as monitors, keyboards, pointing devices, etc.

Computer system 600 further includes a communication or network interface 690. Network interface 690 enables computer system 600 to communicate with remote devices. For example, network interface 690 allows computer system 600 to communicate over communication networks, such as LANs, WANs, the Internet, etc. Network interface 690 may interface with remote sites or networks via wired or wireless connections. Computer system 600 receives data and/or computer programs via network interface 690. The electrical/magnetic signals having contained therein data and/or computer programs received or transmitted by the computer system 600 via interface 690 also represent computer program product(s).

The invention can work with software, hardware, and operating system implementations other than those described herein. Any software, hardware, and operating system implementations suitable for performing the functions described herein can be used.

5. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for providing dynamic quality of service (QoS) for a connection to a virtual private network (VPN), comprising:
   (a) receiving, using a processor, a message from an organization associated with the VPN, wherein the message includes information identifying the VPN connection, information associated with the organization, and information associated with a client;
   (b) retrieving, based on the client information one or more QoS rules or metrics associated with the client for the connection;
   (c) retrieving, based on the organization information one or more QoS rules associated with the organization;
   (d) determining, one or more QoS rules to apply to the connection further comprising of:
      (i) comparing one or more QoS rules associated with the organization to one or more QoS metrics or rules associated with the client for the connection,
      (ii) selecting one or more superior QoS rules based on said comparing, and
      (iii) overriding one or more QoS rules associated with the client for the connection when one or more selected QoS rules is superior to one or more QoS rules or metrics associated with the client for the connection;
   (e) applying the determined one or more QoS rules to the connection.

2. The method of claim 1, wherein one or more QoS rules includes a rule regulating time periods during which a QoS level alteration is applied to the connection can be adjusted.

3. The method of claim 1, wherein one or more QoS rules includes a rule regulating an upload data transfer rate limit applied to the connection.

4. The method of claim 1, wherein one or more QoS rules includes a rule regulating a download data transfer rate limit applied to the connection.

5. The method of claim 1, wherein one or more QoS rules includes a rule regulating an amount of data that can be transmitted over the connection.

6. The method of claim 1, wherein the information associated with the client further includes an Internet Protocol (IP) address of a client device used to establish the connection.

7. The method of claim 6, wherein the IP address is used in step (d) to determine the characteristics of the client device, and wherein said characteristics are used in conjunction with step (d)(ii) to determine the one or more QoS rules to be applied to the connection.

8. The method of claim 1, wherein the message includes information identifying a client's role in the organization, and wherein the client is associated with the connection.

9. The method of claim 8, wherein the client's role is used in step (d) in conjunction with step (d)(ii) to determine the one or more QoS rules to be applied to the connection.

10. The method of claim 1, wherein the message includes information identifying a requested one or more QoS rules to be applied to the connection.

11. The method of claim 1, wherein the step (d) determining includes identifying the policy enforcement point to be used to regulate throughput for the connection.

12. The method of claim 1, further comprising:
   (f) reporting the one or more QoS rules applied to the connection;
   (g) determining, based on an additional message from the organization, if the one or more QoS rules needs to be adjusted; and
   (h) repeating steps (b)-(f) to adjust one or more of the previously-applied QoS rules when the determining in step (g) determines that one or more QoS rules needs to be adjusted.

13. A system for providing dynamic quality of service (QoS) for a connection to a virtual private network (VPN), comprising:
   a listening module coupled to a processor, configured to receive a message from an organization associated with the VPN, wherein the message includes information identifying the VPN connection, information associated with the organization, and information associated with a client;

a QoS module coupled to a processor, configured to retrieve one or more QoS rules associated with the organization based on the organization information, retrieve one or more QoS rules or metrics associated with the client based on the client information and determine one or more QoS rules to apply to the connection wherein one or more QoS rules are determined by:

comparing one or more QoS rules associated with the organization to one or more QoS rules associated with the client for the connection;

selecting one or more superior QoS rules based on said comparing;

overriding one or more QoS rules associated with the client if one or more of the selected QoS rules is superior to one or more QoS rules associated with the client for the connection; and a network policy control module coupled to a processor configured to apply the determined one or more QoS rules to the connection.

14. The system of claim 13, wherein one or more QoS rules includes a rule regulating time periods during which a QoS level alteration is applied to the connection can be adjusted.

15. The system of claim 13, wherein one or more QoS rules includes a rule regulating an upload data transfer rate limit applied to the connection.

16. The system of claim 13, wherein one or more QoS rules includes a rule regulating a download data transfer rate limit applied to the connection.

17. The system of claim 13, wherein one or more QoS rules includes a rule regulating an amount of data that can be transmitted over the connection.

18. The system of claim 13, wherein the message further includes an Internet Protocol (IP) address of a client device used to establish the connection.

19. The system of claim 13, wherein the message includes information identifying one or more requested QoS rules to be applied to the connection.

20. The system of claim 13, wherein the QoS module identifies the policy enforcement point to be used to regulate throughput for the connection.

21. A non-transitory computer readable medium encoded with a computer readable program and when the said program is executed by a processor to provide dynamic quality of service (QoS) for a connection to a virtual private network (VPN), comprising:

a listening means for enabling a processor to receive a message from an organization associated with the VPN, wherein the message includes information identifying the VPN connection, information associated with the organization and information associated with a client;

a retrieving means for enabling a processor to retrieve one or more QoS rules or metrics associated with a client based on the client's information and the connection;

a retrieving means for enabling a processor to retrieve one or more QoS rules associated with the organization based on the organization's information;

a determining means for enabling a processor to determine one or more QoS rules to apply to the connection further comprising of:

a comparing means for enabling a processor to compare one or more QoS rules associated with the organization to one or more QoS rules or metrics associated with the client for the connection, a selecting means for enabling a processor to select one or more superior QoS rules based on said comparing;

an overriding means for enabling a processor to override one or more QoS rules associated with the client if the selected one or more QoS rules are superior to one or more QoS rules or metrics associated with the client;

an application means for enabling a processor to apply the determined one or more QoS rules to the connection.

22. The computer program product of claim 21, further wherein one or more QoS rules includes a rule regulating time periods during which a QoS level alteration is applied to the connection can be adjusted.

23. The computer program product of claim 21, wherein one or more QoS rules includes a rule regulating an upload data transfer rate limit applied to the connection.

24. The computer program product of claim 21, wherein one or more QoS rules includes a rule regulating a download data transfer rate limit applied to the connection.

25. The computer program product of claim 21, wherein one or more QoS rules includes a rule regulating an amount of data that can be transmitted over the connection.

26. The method of claim 1, wherein one or more QoS rules includes a rule regulating a maximum number of boosted connection that are allowed for the organization network.

27. The method of claim 1, wherein one or more QoS rules includes a rule regulating session admission control checks for the client's devices.

28. The method of claim 2, wherein the rule regulating time periods during which a QoS level alteration is applied to the connection can be adjusted includes normal working hours of the organization.

29. The method of claim 1, wherein one or more QoS rules or metrics associated with the client and one or more QoS rules associated with the organization further include at least one of availability, bandwidth, latency and delay for the connection.

30. The method of claim 1, wherein the information associated with the organization includes an organization identifier that uniquely identifies the organization associated with the organization network.

* * * * *

UNITED STATES PATENT AND TRADEMARK OFFICE
CERTIFICATE OF CORRECTION

| | | |
|---|---|---|
| PATENT NO. | : 7,852,849 B2 | |
| APPLICATION NO. | : 12/042078 | |
| DATED | : December 14, 2010 | |
| INVENTOR(S) | : Andrew Jamie Davidson | |

It is certified that error appears in the above-identified patent and that said Letters Patent is hereby corrected as shown below:

Column 18, line 34, "boost connection that are allowed" should be replaced with --boosted connections that are allowed--.

Signed and Sealed this
Thirteenth Day of March, 2012

David J. Kappos
*Director of the United States Patent and Trademark Office*